US008189510B2

(12) United States Patent
Sakumoto

(10) Patent No.: US 8,189,510 B2
(45) Date of Patent: May 29, 2012

(54) MOBILE IP COMMUNICATION SYSTEM

(75) Inventor: Kazunori Sakumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 570 days.

(21) Appl. No.: 12/403,102

(22) Filed: Mar. 12, 2009

(65) Prior Publication Data

US 2009/0190529 A1 Jul. 30, 2009

Related U.S. Application Data

(63) Continuation of application No. PCT/JP2006/319370, filed on Sep. 28, 2006.

(51) Int. Cl.
*H04W 4/00* (2009.01)
*H04J 3/24* (2006.01)
*H04L 12/28* (2006.01)

(52) U.S. Cl. .................. 370/328; 370/349; 370/392

(58) Field of Classification Search .............. None
See application file for complete search history.

(56) References Cited

U.S. PATENT DOCUMENTS

| 7,349,328 | B2 | 3/2008 | Watanbe | |
| 2004/0066749 | A1 | 4/2004 | Watanabe | |
| 2004/0151148 | A1* | 8/2004 | Yahagi | 370/338 |
| 2005/0221823 | A1 | 10/2005 | Noguchi et al. | |
| 2005/0232146 | A1* | 10/2005 | Lee et al. | 370/225 |
| 2006/0013126 | A1 | 1/2006 | Yasuoka et al. | |

FOREIGN PATENT DOCUMENTS

| GB | 2 360 423 | 9/2001 |
| JP | 08-186605 | 7/1996 |
| JP | 11-088358 | 3/1999 |
| JP | 2001-127803 | 5/2001 |
| JP | 2004-120411 | 4/2004 |
| JP | 2005-295232 | 10/2005 |
| JP | 2006-33124 | 2/2006 |

OTHER PUBLICATIONS

Omar H et al: "Support for fault tolerance in local registration mobile-IP systems" Military Communications Conference Proceedings, 1999. MILCOM 1999. IEE E Atlantic City, NJ, USA Oct. 31-Nov. 3, 1999, Piscataway, NJ, USA, IEEE, US, vol. 1, Oct. 31, 1999, pp. 126-130, XP010369540 ISBN:978-0-7803-5583-5 Sections I. III.A. and IV.
Extended European Search Report issued on Oct. 13, 2010 in European Patent Application No. 06 798 418.7.
International Search Report dated Dec. 26, 2006.

* cited by examiner

*Primary Examiner* — Chirag Shah
*Assistant Examiner* — Srinivasa Reddivalam
(74) *Attorney, Agent, or Firm* — Murphy & King, P.C.

(57) ABSTRACT

A mobile IP communication system includes a home agent 1 and a plurality of foreign agents 6a-6c. The home agent 1 manages the location of a mobile node 4. The mobile node 4 transmits a location registration request to the foreign agent 6a. The foreign agent 6a transmits the location registration request to the home agent 1 via a path routed trough a router R1, in accordance with a routing table. When there is congestion in the path routed through the router R1, the foreign agent 6a transfers the location registration request to the foreign agent 6b. The foreign agent 6b transfers the location registration request to the home agent 1.

10 Claims, 19 Drawing Sheets

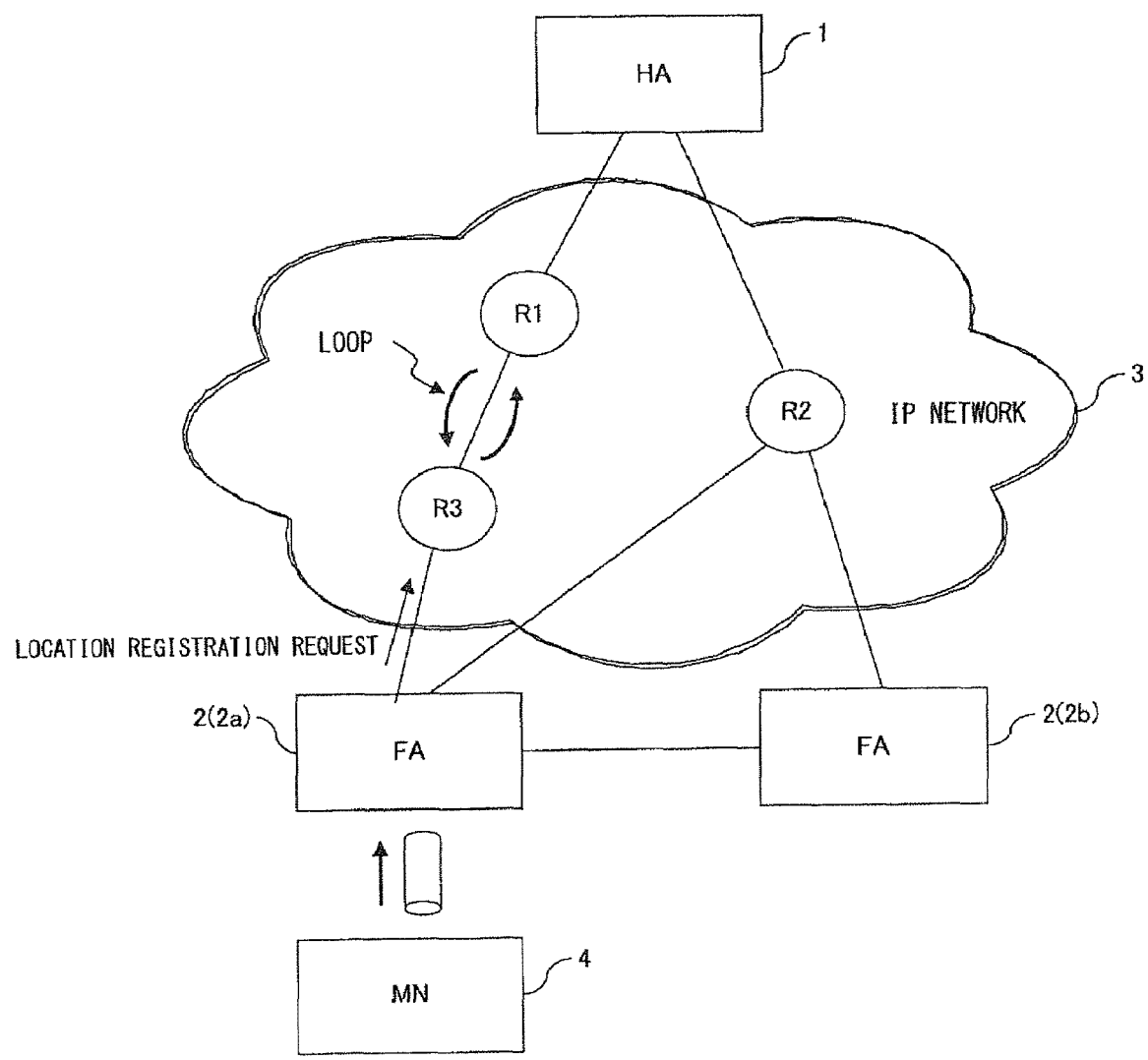
F I G. 3

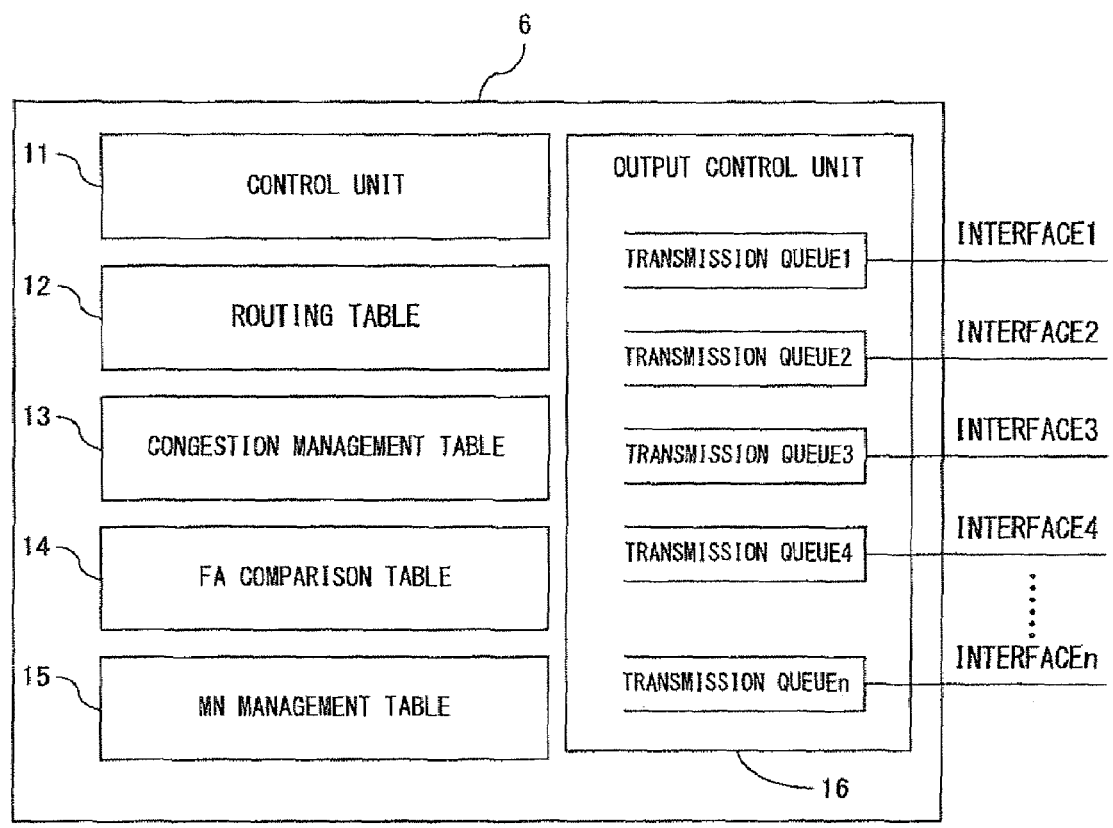
F I G. 5

| Network | METRIC | Next Hop | OUTPUT INTERFACE |
|---|---|---|---|
| 192.168.10.0/24 | 0 | 192.168.1.1 | INTERFACE1 |
| 192.168.20.0/24 | 100 | 192.168.2.10 | INTERFACE2 |
| 192.168.30.0/24 | 70 | 192.168.2.10 | INTERFACE2 |
| 172.16.0.0/16 | 200 | 192.168.5.1 | INTERFACE5 |
| 172.17.0.0/16 | 200 | 192.168.4.1 | INTERFACE4 |
| 10.1.1.0/24 | 10 | 192.168.2.5 | INTERFACE2 |
| 10.1.2.0/24 | 150 | 192.168.3.1 | INTERFACE3 |
| 10.2.1.0/24 | 150 | 192.168.5.1 | INTERFACE5 |

FIG. 8

| INTERFACE | QUEUE USAGE RATE (%) | CONGESTION DETECTION TIMER (s) | CONGESTION RECOVERY TIMER (s) | CONGESTION MARK |
|---|---|---|---|---|
| INTERFACE1 | 10 | — | | — |
| INTERFACE2 | 100 | 3 | | — |
| INTERFACE3 | 80 | 60 | | V |
| INTERFACE4 | 0 | — | 5 | V |
| INTERFACE5 | 20 | — | 40 | — |

F I G. 1 0

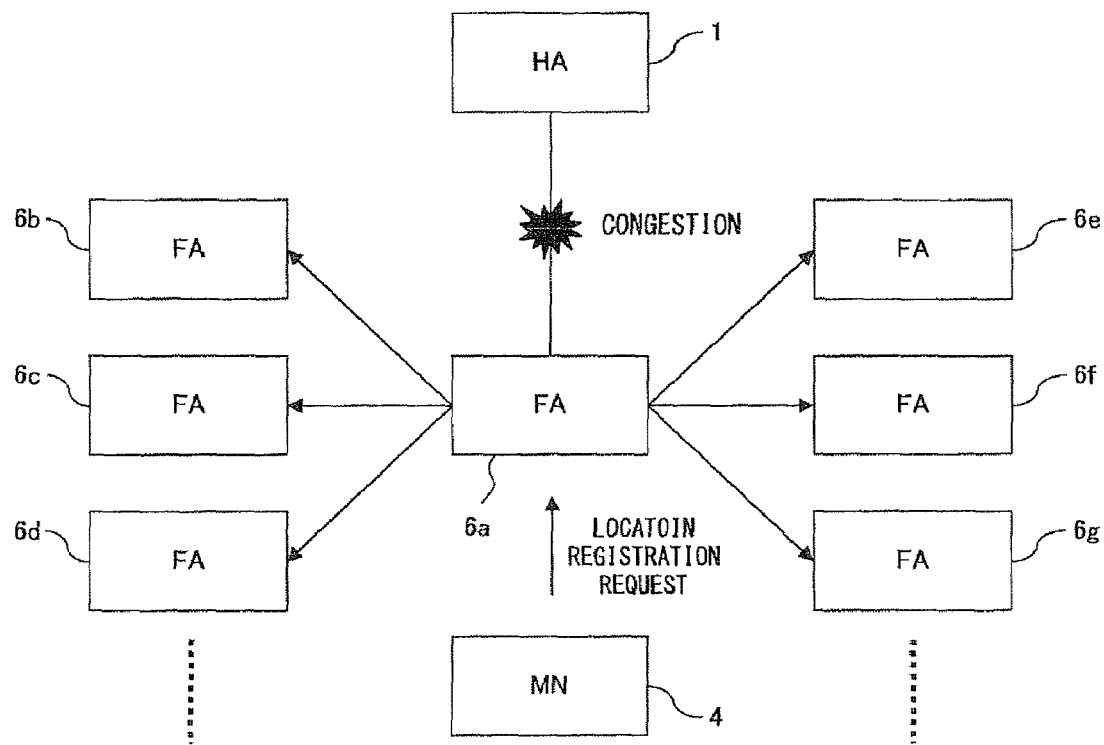
F I G. 1 2

| RESPONDING FA (ADJACENT FA) | METRIC TO HA | QUEUE USAGE RATE | METRIC TO RESPONDING FA | TOTAL METRIC |
|---|---|---|---|---|
| FA (6b) | 100 | 50% | 50 | 150 |
| FA (6c) | 50 | 10% | 200 | 250 |
| FA (6e) | 200 | 20% | 10 | 210 |
| FA (6f) | 50 | 40% | 100 | 150 |

FIG. 14

LOCATION REGISTRATION REQUEST PACKET FROM BASE FA TO ADJACENT FA

| IP HEADER | UDP HEADER | Mobile IP |
|---|---|---|
| SOURCE : MN<br>DESTINATION: ADJACENT FA | DESTINATION PORT :<br>Mobile IP | MESSAGE TYPE: LOCATION REGISTRATION REQUEST<br>HOME ADDRESS: IP ADDRESS OF MN<br>HA ADDRESS: IP ADDRESS OF HA<br>CoA(Care of Address): IP address of FA |

F I G. 1 5

| MN | MN CONNECTION INTERFACE | HA | ADJACENT FA | ADJACENT FA CONNECTION INTERFACE |
|---|---|---|---|---|
| 172.16.1.100 (MN a) | INTERFACE1 | 10.1.1.100 | — | — |
| 172.16.1.150 (MN b) | INTERFACE1 | 10.1.1.100 | FA c | INTERFACE2 |
| 172.16.1.200 (MN c) | INTERFACE1 | 10.1.1.100 | FA f | INTERFACE5 |

F I G. 1 8

MOBILE IP COMMUNICATION SYSTEM

CROSS-REFERENCE TO RELATED APPLICATIONS

This is a continuation application of International Application Number PCT/JP2006/319370, which was filed on Sep. 28, 2006.

TECHNICAL FIELD

The present invention relates to a mobile IP communication, and particularly to a technique for switching communication paths in a mobile IP communication system.

BACKGROUND ART

In recent years, mobile communication systems have become widely popular, and the users have started to demand "availability of communication anytime anywhere". Accordingly, the mobile IP communication is attracting attention as a technology for satisfying the demand. The mobile IP is an Internet protocol that has been developed for mobile station, which enables the use of the same IP address even when a terminal moves outside a home subnet. The mobile IP communication is described in detail in RFC3344.

FIG. 1 is a diagram illustrating the configuration of a general mobile IP communication system. In FIG. 1, a home agent (HA) 1 manages the address, location, and the like of each mobile node. A foreign agent (FA) 2 has an edge node router function, and is capable of accommodating a mobile node. The home agent 1 and foreign agent 2 are connected via an IP network 3.

Each foreign agent 2 (2a, 2b) broadcasts network information regularly, using a base station. The network information contains information for identifying a foreign agent being the source of the network information. A mobile node 4 performs location registration, when a source of newly-received network information is different from a source of previously-received network information. The location registration is performed as well, when the power of the mobile node 4 is turned on. The procedure for the location registration is described below. It is assumed here that the mobile node 4 performs the location registration with the foreign agent 2a.
(a) The mobile node 4 transmits a location registration request to the foreign agent 2a.
(b) The foreign agent 2a that received the location registration request transfers the location registration request to the home agent 1.
(c) The home agent 1 registers the location (that is, the information for identifying the foreign agent 2a) of the mobile node 4, and returns a location registration response. Accordingly, a communication path (tunnel path) is set up between the home agent 1 and the foreign agent 2a.
(d) A communication path is set up between the foreign agent 2a and the mobile node 4.

After the communication path described above is set up, it is assumed that a correspondent node (CN) 5 transmits a packet to the mobile node 4. At this time, since the IP address of the mobile node 4 is written into a destination address of the packet, the packet is sent to the home agent 1. Then, the home agent 1 transfers the packet to the foreign agent 2a, and the foreign agent 2a further transfers the packet to the mobile node 4. Thus, in the mobile IP communication system, the communication can be carried on using the same IP address, even when the mobile node 4 moves outside the home subnet.

Meanwhile, the mobile IP communication is based on the IP network technology. However, in the IP network, it is difficult to switch communication paths when a congestion or failure occurs. MPLS-TE has known as a technique for avoiding congestion. However, in order to use the method, the MPLS-TE needs to be implemented for each node in a network, and further, a path for avoiding congestion needs to be set up in advance, so the method cannot be adopted easily. For this reason, when congestion or a failure occurs in a mobile IP communication system, it may disable the communication, even though there is a bypass route.

FIG. 2 and FIG. 3 are diagrams describing a problem of the conventional mobile IP communication system. In the mobile IP communication system, generally, in the same manner as in the IP network, only one communication path is set up from a node to its destination node. In other words, only one optimal path is set up between nodes. For example, in the system illustrated in FIG. 2, a foreign agent 2a only has information indicating that the next hop is a router R1, as information directing the path to the home agent 1. In addition, the conventional mobile IP system does not have the function of selecting another path when congestion or failure occurs.

For this reason, when congestion occurs in the optimal path between a foreign agent and a home agent, the location registration may not be carried out, and the communication may not be continued. FIG. 2 illustrates a situation in which congestion occurs in the optimal path from the foreign agent 2a to the home agent 1 (the path routed through a router R1). In addition, in the same manner, when a failure occurs in the optimal path between the foreign agent and the home agent, the communication may not be continued. FIG. 3 illustrates a situation in which a loop is generated at the routers R1, R3 located in the optimal path.

Meanwhile, Patent Document 1 describes a method for avoiding the situation in which the location registration request cannot be performed due to a failure, in a mobile IP communication system. The system adopts a redundant configuration, and aims to shorten the time in which the service is suspended, by continuing the communication using a backup system when a failure occurs in a current system.

Patent Document 1: Japanese Laid-open Patent Publication No. 2004-120411

DISCLOSURE OF INVENTION

It is an object of the present invention is to perform location registration in the mobile IP communication, even when congestion or failure occurs.

A mobile IP communication system according to the present invention includes a home agent that manages a location of a mobile node in accordance with a location registration request and a plurality of foreign agents that are capable of accommodating a mobile node. Each of the foreign agents includes storage means for storing routing information representing a communication path to the home agent; detection means for detecting a state of the communication path to the home agent represented by the routing information; and transfer means for transferring a received location registration request. The transfer means of a first foreign agent transfers the received location registration request in accordance with routing information stored in the storage means of the first foreign agent, when the communication path between the first foreign agent and the home agent is in a normal state. Meanwhile, the transfer means of the first foreign agent transfers the received location registration request to a second foreign agent, when the communication path between the first foreign agent and the home agent is not in the normal state.

In the system described above, when the communication path between the first agent that receives a location registration request from the mobile node and the home agent is not in the normal state, the location registration request is transferred to the second foreign agent, and transmitted to the home agent from the second foreign agent. At this time, the communication path between the second foreign agent and the home agent is different from the communication path between the first foreign agent and the home agent, so the second foreign agent is able to transmit, to the home agent, the location registration request received from the first foreign agent. In other words, a bypass route can be established, without changing the setting of the communication device (such as a router) in the network that connects the home agent and the foreign agents.

According to the present invention, in the mobile IP communication, even when congestion or failure occurs in a communication path between a foreign agent that receives a location registration request from a mobile node and the home agent of the mobile node, the location registration is ensured by using a bypass route.

BRIEF DESCRIPTION OF DRAWINGS

FIG. 3 is a diagram (2) describing a problem of the conventional mobile IP communication system.

FIG. 5 is a diagram illustrating the configuration of a foreign agent.

FIG. 8 is an example of a routing table.

FIG. 10 is an example of a congestion management table.

FIG. 12 is a diagram describing an inquiry request to an adjacent foreign agent.

FIG. 14 is an example of an FA comparison table.

FIG. 15 is a diagram illustrating the data structure of a location registration request transmitted from a base foreign agent to an adjacent foreign agent.

FIG. 18 is an example of an MN management table.

BEST MODE OF CARRYING OUT THE INVENTION

Figure 4:
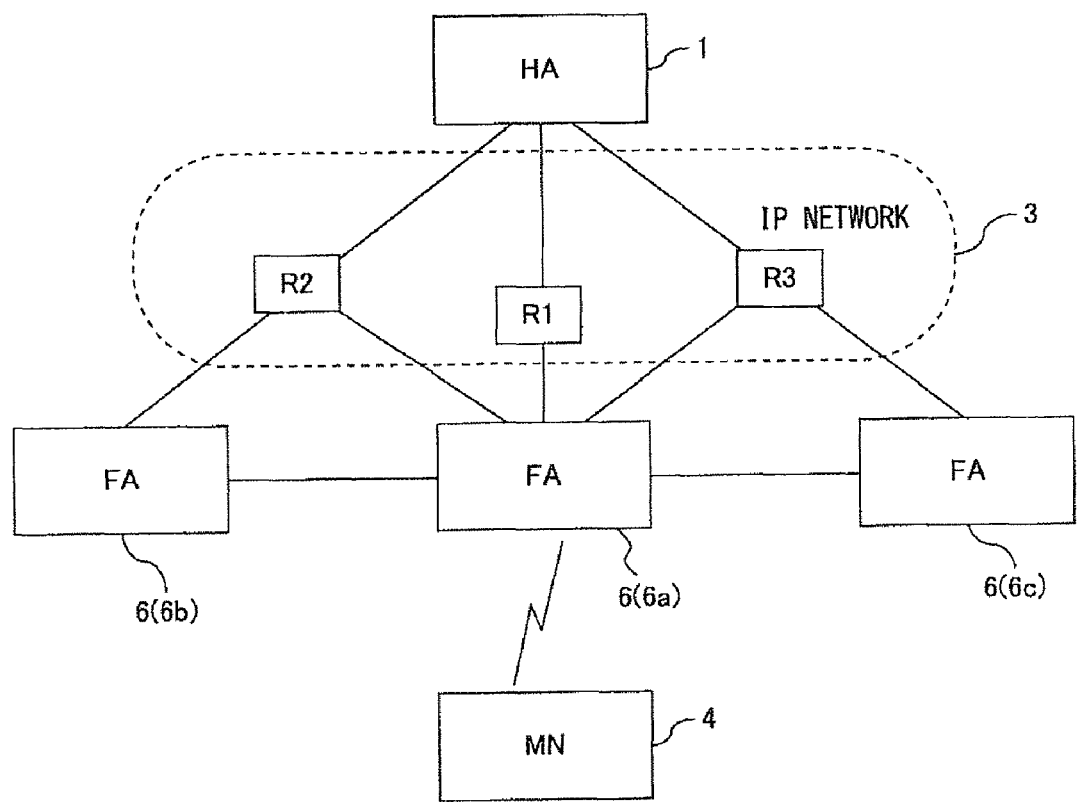
FIG. 4 is a diagram illustrating the configuration of a mobile IP communication system according to an embodiment of the present invention.

FIG. 4 is a diagram illustrating the configuration of a mobile IP communication system according to an embodiment of the present invention. In FIG. 4, a home agent (HA) 1, an IP network 3, and a mobile node (MN) 4 may be implemented by a known art. In other words, the home agent 1 manages the location of the mobile node 4 using a location registration request transmitted from the mobile node 4.

Foreign agents 6 (6a-6c) are nodes that are capable of accommodating the mobile node 4, and have an edge node router function. The home agent 1 and the foreign agents 6 are connected via the IP network 3. The IP network 3 has a number of core node routers, and transfers a packed to a destination in accordance with a known routing protocol. Here, the number of the communication path (optimal path) set up for transmitting a packet from a source node to a destination node is one. In the example illustrated in FIG. 4, three routes exist between the home agent 1 and the foreign agent 6a. Then, one of them (for example, the path routed through a router R1) is defined as the communication path for transmitting a packet from the foreign agent 6a to the home agent 1. The routing information that defines the communication paths between nodes is created in advance and stored in a routing table provided in each node.

Each foreign agent 6 is connected to one or more other foreign agent(s) without intervention of a core node router. In other words, the foreign agents 6 are respectively connected to a plurality of foreign agents of which hop count is one.

Figure 1:
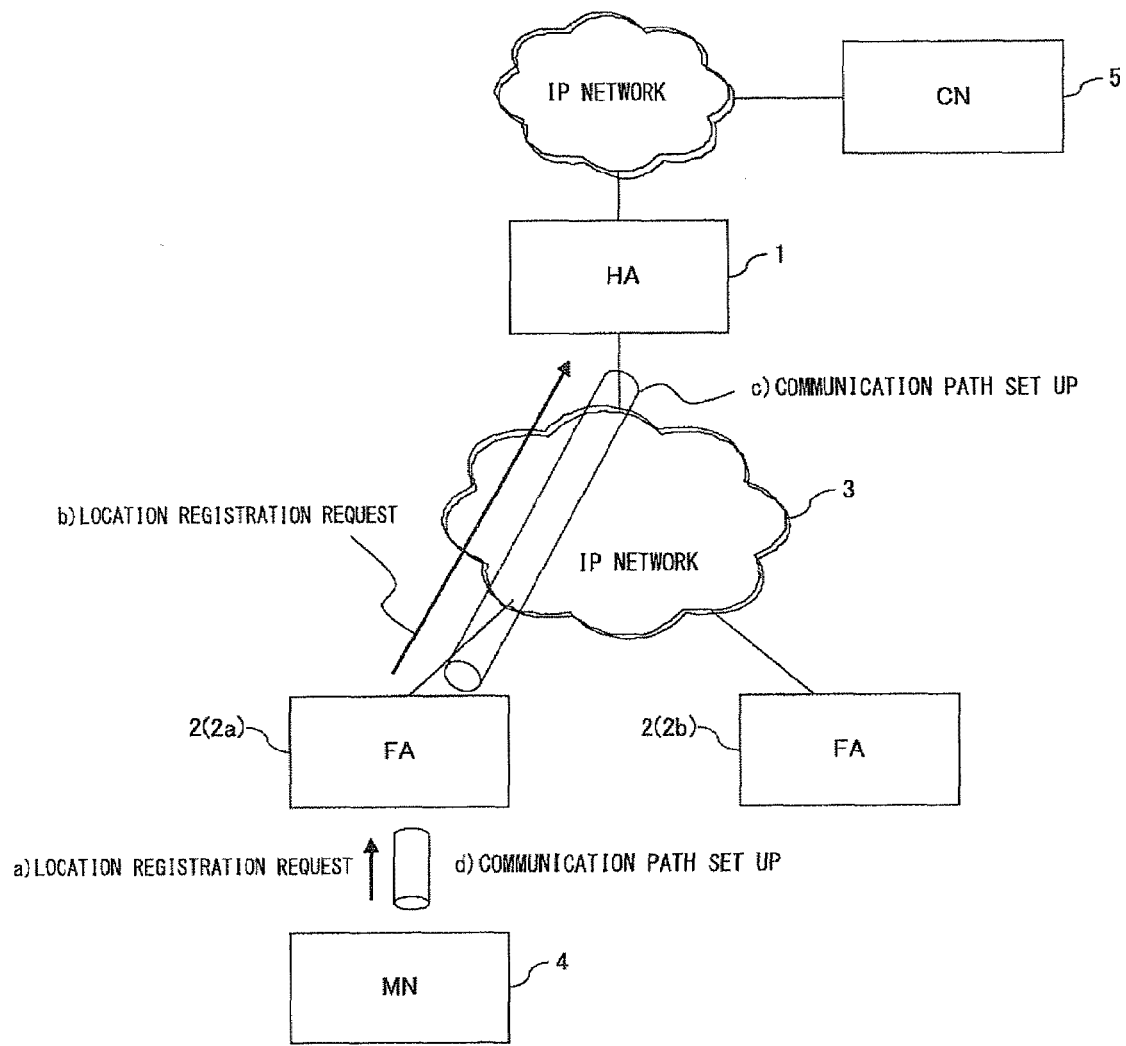
FIG. 1 is a block diagram illustrating a general mobile IP communication system.
Figure 2:
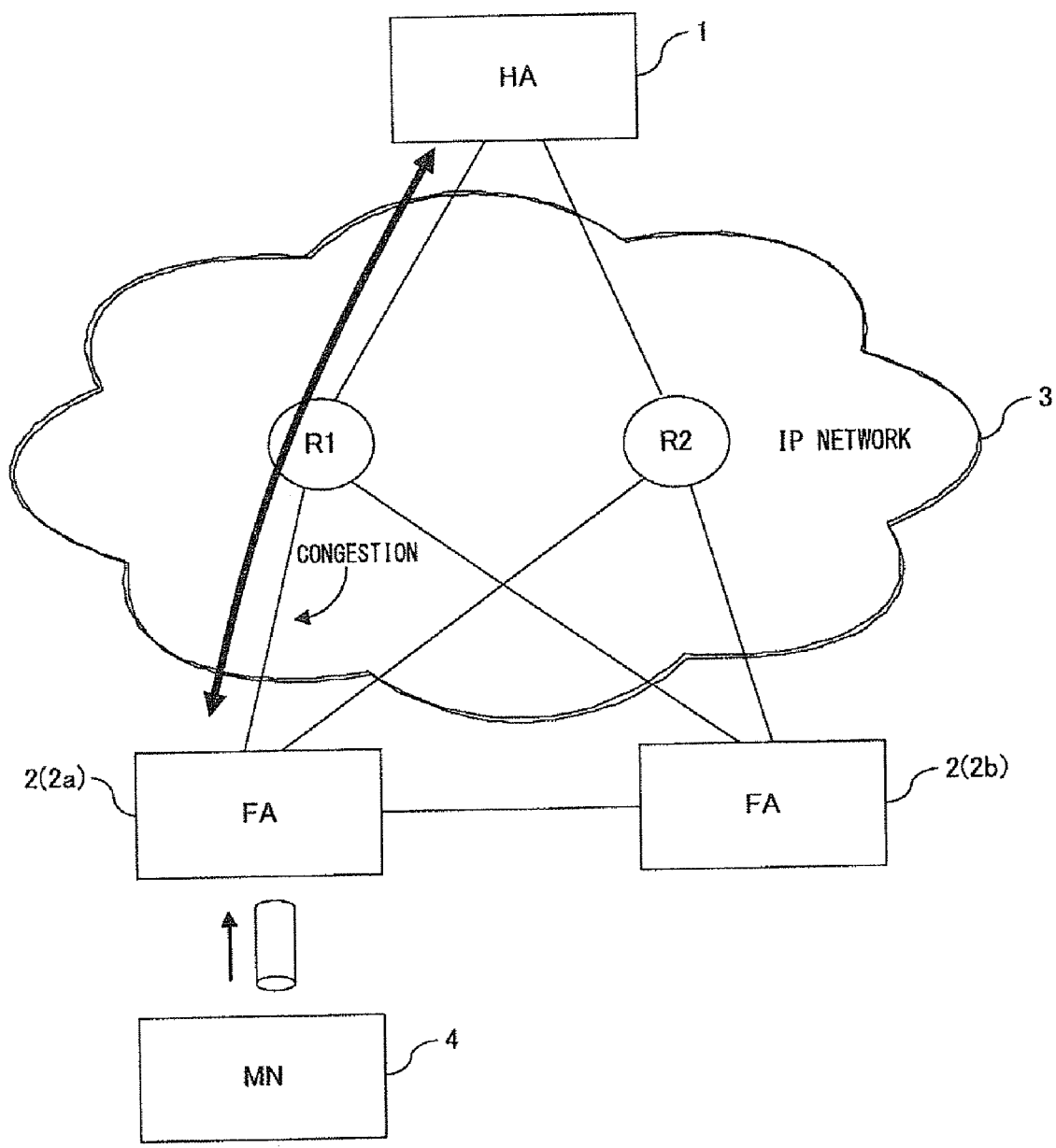
FIG. 2 is a diagram (1) describing a problem of the conventional mobile IP communication system.

In the mobile IP communication system configured as described above, the mobile node 4 periodically transmits a location registration request, and the home agent 1 manages the location of the mobile node 4 in accordance with the location registration request. Here, when the communication path between the home agent 1 and the foreign agent 6 is in a normal state, the location registration procedure is performed as described referring to FIG. 1, basically. On the other hand, when congestion or failure occurs in the communication path between the home agent 1 and the foreign agent 6, the foreign agent 6 transfers the location registration request using another path. However, in order to switch the paths in the IP network, the routing table(s) of one or more core router(s) needs to be updated, involving difficulty. Therefore, in the mobile IP communication system according to the embodiment, the foreign agent 6 (for example, 6a) that received the location registration request from the mobile node 4 requests, when there is congestion or failure in the communication path to the home agent 1, another foreign agent (for example, 6b) to transfer the location registration request. As a result, the transfer of the location registration request from the mobile node 4 to the home agent 1 is ensured and the home agent 1 is able to manage the location of the mobile node 4 constantly, so the communication of the mobile node 4 stays uninterrupted.

FIG. 5 is a diagram illustrating the configuration of the foreign agent 6. FIG. 5 illustrates only the elements that are directly related to the present invention.

The foreign agent 6 has a plurality of interfaces (1–n) Each of the interfaces is connected to one corresponding router or one corresponding foreign agent, respectively by means of an optical fiber cable, metal cable and the like. Meanwhile, in FIG. 5, a wireless circuit that performs transmission/reception of a signal with the mobile node 4 is omitted.

A control unit 11 controls the operation of the foreign agent 6. In other words, the control unit 11 has functions such as to transfer a location registration request transmitted from a mobile node to the home agent, and to transfer a packet for the mobile node received via a tunnel from the home agent to the mobile node. In addition, the foreign agent 6 includes a routing table 12, a congestion management table 13, an FA comparison table 14, and an MN management table 15. These tables are to be explained in detail later. An output control unit 16 controls the output of packets. In addition, the output control unit 16 detects the congestion state of each interface. The congestion state is determined on the basis of the packet amount (that is, a queue usage rate) stored in a transmission queue (buffer memory) provided in each interface.

Figure 6:
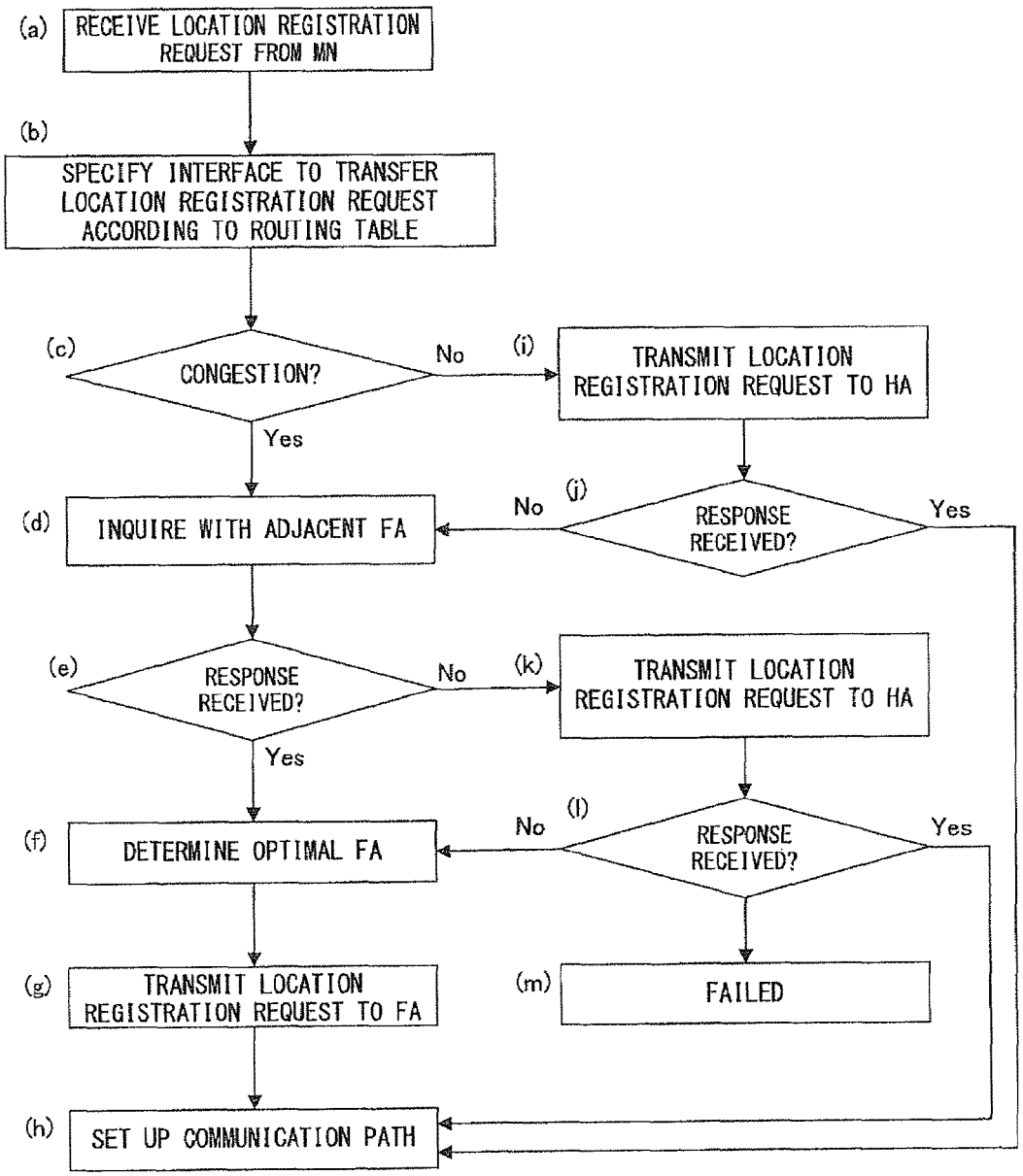
FIG. 6 is a flowchart describing a location registration procedure according to the embodiment.

FIG. 6 is a flowchart illustrating a location registration procedure according to the embodiment. The processes in the flowchart are performed by the foreign agent 6 that receives a location registration request from the mobile node 4. In the following description, the foreign agent that receives a location registration request from the mobile node 4 may be referred to as a "base foreign agent."

<Step a>

The foreign agent 6 periodically broadcasts network information via a base station. The network information is location information, which contains information to identify the foreign agent being the source of the network information. Therefore, the mobile node 4 is able to recognize the foreign agent that is accommodating the mobile node, on the basis of the network information. Then, the mobile node 4 generates and transmits a location registration request, when the source of newly-received network information is different from the source of previously-received network information. When the foreign agent 6 receives the location registration request from the mobile node 4, transition to step b is performed. The mobile node 4 also transmits a location registration request when the power is turned on. In addition, in the mobile IP communication system according to the embodiment, the foreign agent sometimes receives a location registration request from another foreign agent.

Figure 7:
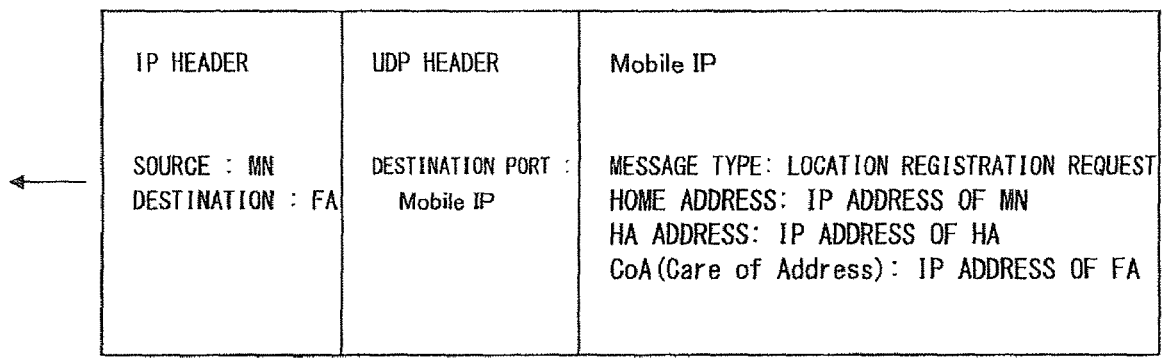
FIG. 7 is a diagram illustrating the data structure of a location registration request transmitted from a mobile node.

FIG. 7 is a diagram illustrating the data structure of a location registration request transmitted from the mobile node 4 to the foreign agent 6. Here, the location registration request is stored and transmitted in an IP packet. An IP header has an area to store the source address and the destination address. The source address is the IP address of the mobile node 4 that transmitted the location registration request. The destination address is the IP address of the foreign agent 6 that accommodates the mobile node 4. A UDP header has an area to store the destination port number. A value for identifying the mobile IP is set for the destination port number. A mobile IP data area stores the message type (location registration request), the home address (IP address of the mobile node 4 that transmitted the location registration request), the HA address (IP address of the home agent 1), the care-of address CoA (IP address of the foreign agent 6 that receives the location registration request).

<Step b>

A control unit 11 of the base foreign agent analyzes the received location registration request, and detects the home agent to which the location registration is to be transferred. Here, the mobile IP communication system according to the embodiment has a plurality of home agents. However, each mobile node is managed by one home agent determined respectively in advance. The base foreign agent refers to a routing table 12 and specifies the interface for transmitting a packet to the detected home agent.

FIG. 8 is an example of the routing table 12. The metric, next hop, output interface for each destination network are registered in the routing table 12. The metric represents the cost incurred in the path to the destination network, which is calculated in accordance with the hop count on the way to the destination network, the bandwidth of the line on the way to the destination network, and so on. The output interface represents the line connected to the node specified by the next hop.

<Step c>

Figure 9:
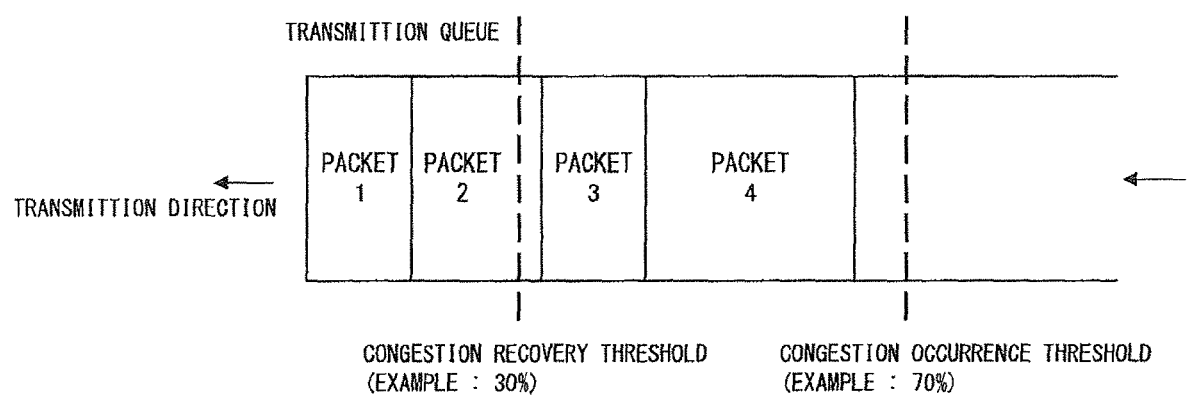
FIG. 9 is an example of a transmission queue provided in each interface.

The control unit 11 and the output control unit 16 check the congestion state of the interface specified in step b. A transmission queue is provided respectively in each interface. The transmission queue is a FIFO memory as illustrated in FIG. 9, and temporally stores packets to be output to the next hop. In addition, a congestion occurrence threshold and a congestion recovery threshold are set in the transmission queue. The output control unit 16 monitors the congestion state of each interface using those thresholds. When the usage rate of the transmission queue exceeds the congestion occurrence threshold (for example, 70%), a detection timer is activated. Then, when the state in which the usage rate is over the congestion occurrence threshold lasts for a predetermined time (for example, 30 seconds), it is determined that there is congestion, and a corresponding congestion flag is set. Since the traffic of the IP network has a burst characteristic, the usage rate of the transmission queue sometimes increases momentarily. Then, while it is to be described in detail later, when congestion is detected in the path to the home agent 1, the path for transmitting the location registration request is switched. Therefore, the timer value is determined appropriately so that the switching of the path due to the congestion does not occur more frequently than required.

When the congestion is suppressed and the usage rate of the transmission queue falls below the congestion recovery threshold, a recovery timer is activated. Then, when the status in which the usage rate is below the congestion recovery threshold lasts for a predetermined time (for example, 30 seconds), it is determined that the congestion has been suppressed, and the congestion flag is cleared.

FIG. 10 is an example of the congestion management table 13. The congestion management table 13 manages, respectively for each interface, the usage rate of the transmission queue, time information of the detection timer for detecting that there is congestion, time information of the recovery timer for detecting that congestion has been suppressed, and the congestion flag. The congestion management table 13 is updated regularly. In the example illustrated in FIG. 10, in an interface 1, the queue usage rate is below the congestion occurrence threshold, so the detection timer has not been activated. In an interface 2, the queue usage rate is over the congestion occurrence threshold, so the detection timer has been activated. However, since the timer has not expired yet, the congestion flag has not been set. In an interface 3, the queue usage rate is over the congestion occurrence threshold, and the detection timer has already expired, so the congestion flag has been set.

The foreign agent 6 can detect the congestion in each interface as described above. Then, the control unit 11 checks whether or not there is congestion in the communication path to the home agent 1, referring to the congestion management table 13. When there is congestion, step d is performed, and when there is no congestion, step i is performed.

<Step i>

Figure 11:
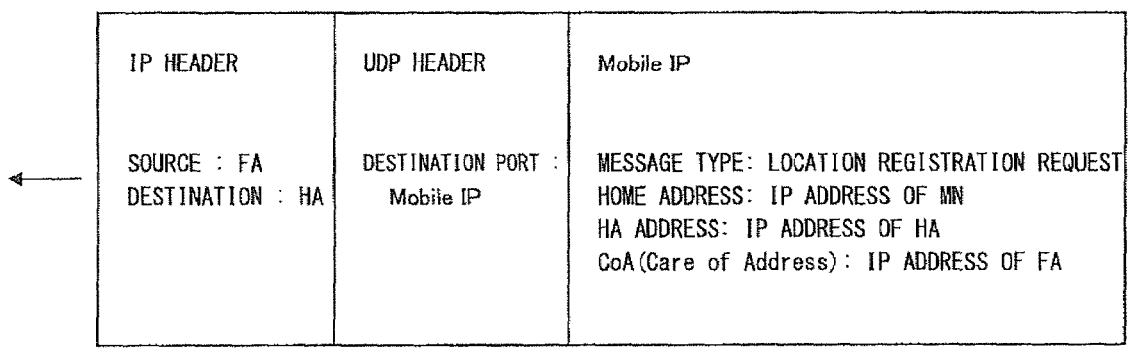
FIG. 11 is a diagram illustrating the data structure of a location registration request transmitted from a base foreign agent to an adjacent foreign agent.

When there is no congestion in the communication path to the home agent 1, the base foreign agent transmits a location registration request to the home agent 1 according to the normal mobile IP procedure. At this time, the base foreign agent detects the interface to transmit the location registration request, referring to its own routing table. The packet that stores the location registration request is basically the same as the packet that carries the location registration request from the mobile node 4 to the foreign agent, as illustrated in FIG. 11. However, in the packet that carries the location registration request from the base foreign agent to the home agent 1, the IP address of the base foreign agent is set as the source address, and the IP address of the home agent 1 is set as the destination address.

The location registration request is transferred to the home agent 1 in accordance with the destination address. Upon receiving the location registration request, the home agent 1 performs the corresponding registration procedure, and then returns a location registration response.

<Step j>

The base foreign agent checks whether or not it can receive a location registration response within a predetermined time. When the base foreign agent receives a location registration response within the predetermined time, it is determined that the location registration has been successful, and step h is performed. On the other hand, when the base foreign agent does not receive a location registration response within the predetermined time, there is a possibility that a failure has occurred between the base foreign agent and the home agent 1, so the base foreign agent retransmits the location registration request. Then, when it fails to receive a location registration response after performing the retransmission for a predetermined time (for example, three times), it is determined that there is a failure between the base foreign agent and the home agent 1, and step d is performed.

<Step d>

Step d is performed when there is congestion in the communication path from the base foreign agent to the home agent 1, and when there is a failure in the communication path between the base foreign agent and the home agent 1.

When the congestion or failure mentioned above has occurred, the base foreign agent transmits an inquiry request to adjacent foreign agents. The inquiry request is transmitted in multicast. In the example illustrated in FIG. 12, when the foreign agent 6a receives the location registration request from the mobile node 4a, there is congestion in the communication path from the foreign agent 6a to the home agent 1. In this case, the foreign agent 6a is the base foreign agent, and transmits the inquiry request to adjacent foreign agents 6b-6g. Here, the adjacent foreign agent is a foreign agent that can be reached from the base foreign agent through one hop. In other words, the inquiry request is transmitted to the foreign agents located in the area that can be reached by a packet with TTL=1. According to this system, the compatibility with the existing IP technology is ensured in the sequence in which the base foreign agent requests adjacent foreign agents to transfer the location registration.

Figure 13:
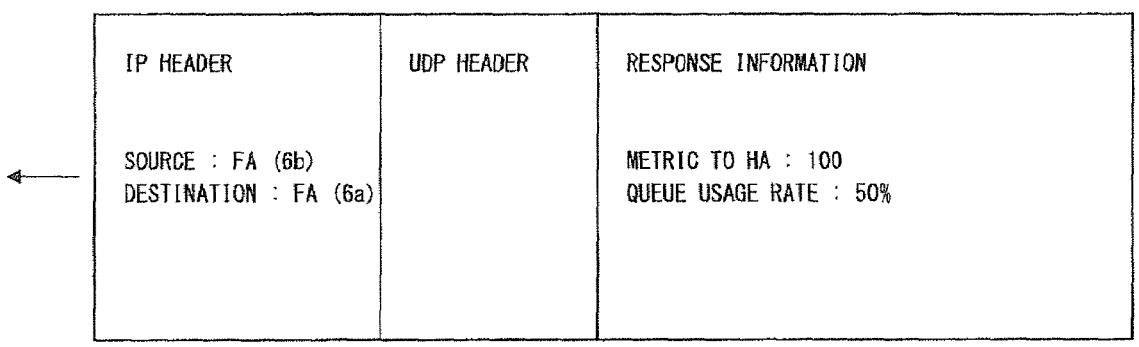
FIG. 13 is a diagram illustrating the data structure of an inquiry response.

The adjacent foreign agents that receive the inquiry request respectively check the metric of the communication path to the home agent 1, and the congestion state of the communication path to the home agent 1. Here, the metric of the communication path to the home agent 1 is calculated in advance and stored in the routing table illustrated in FIG. 8. In addition, the congestion state of the communication path to the home agent 1 is indicated by the queue usage rate of the corresponding interface, and is written into the congestion management table illustrated in FIG. 10. Then, the adjacent foreign agents that receive the inquiry request respectively return an inquiry response to the base foreign agent. Meanwhile, FIG. 13 illustrates an example of an inquiry response returned from the foreign agent 6b to the foreign agent 6a.

The adjacent foreign agent may be configured so as not to return the inquiry response when it does not have route information to the home agent 1 (that is, when it does not have reachability to the home agent 1) or when there is congestion in the communication path to the home agent 1. This configuration makes it possible to suppress unnecessary transmission load. In addition, the adjacent foreign agent does not respond to the inquiry request when the next hop in the optimal path to the home agent 1 is another base foreign agent, in order to avoid a routing loop. Thus, the base foreign agent receives the inquiry response only from the adjacent foreign agents that can transfer the location registration request to the home agent 1.

<Step e>

The control unit 11 of the base foreign agent collects inquiry responses from the adjacent foreign agents. At this time, when an inquiry response is received from one or more adjacent foreign agents, step f is performed. When no inquiry response is received from the adjacent foreign agents, step k is performed.

<Step f>

Upon receiving an inquiry response, the control unit 11 of the base foreign agent generates an FA comparison table illustrated in FIG. 14. In FIG. 14, "METRIC TO HA" is the metric of the communication path from the responding foreign agent to the home agent 1, which is informed by the inquiry response. "QUEUE USAGE STATE" indicates the congestion state of the communication path from the responding foreign agent to the home agent 1, which is informed by the inquiry response. "METRIC TO RESPONDING FA" is the metric of the communication path from the base foreign agent to the responding foreign agent, which is calculated in advance. "TOTAL METRIC" is the sum of "METRIC TO HA" and "METRIC TO RESPONDING FA".

Next, the control unit 11 refers to the generated FA comparison table and selects the foreign agent to request the transfer of the location registration request. In this case, the foreign agent having the smallest total metric is selected. In other words, the adjacent foreign agent that minimizes the network distance from the base foreign agent to the home agent 1 is selected. Meanwhile, when two or more adjacent foreign agents have the same total metric, the foreign agent with the lowest queue usage rate is selected. In the example illustrated in FIG. 14, the foreign agent 6f is selected from the four adjacent foreign agents (6b, 6c, 6e, 6f).

<Step g>

The control unit 11 of the base foreign agent transmits the location registration request to the adjacent foreign agent selected in step f. The location registration request transmitted from the base foreign agent to the adjacent foreign agent is basically the same as the packet that carries the location registration request from the mobile node 4 to the foreign agent, as illustrated in FIG. 15. However, in the packet that carries the location registration request from the base foreign agent to the adjacent foreign agent, the IP address of the mobile node 4 is set as the source address, and the IP address of the adjacent foreign agent is set as the destination address.

<Step h>

In step h, the communication path is set up between the home agent 1 and the base foreign agent. At this time, when the state of the communication path between the home agent 1 and the base foreign agent is normal (step j: Yes), a tunnel is set up in accordance with the normal mobile IP procedure. In other words, a mobile IP tunnel is set up between the home agent 1 and the base foreign agent.

On the other hand, when there is congestion in the communication path between the home agent 1 and the base foreign agent (step c: Yes), or when there is a failure in the communication path (step j: No), the control unit 11 of the base foreign agent defines a bypass route using the MN management table 15. Accordingly, a communication path for the mobile node 4 is established between the base foreign agent and the adjacent foreign agent.

<Operation of the Adjacent Foreign Agent>

Figure 16:
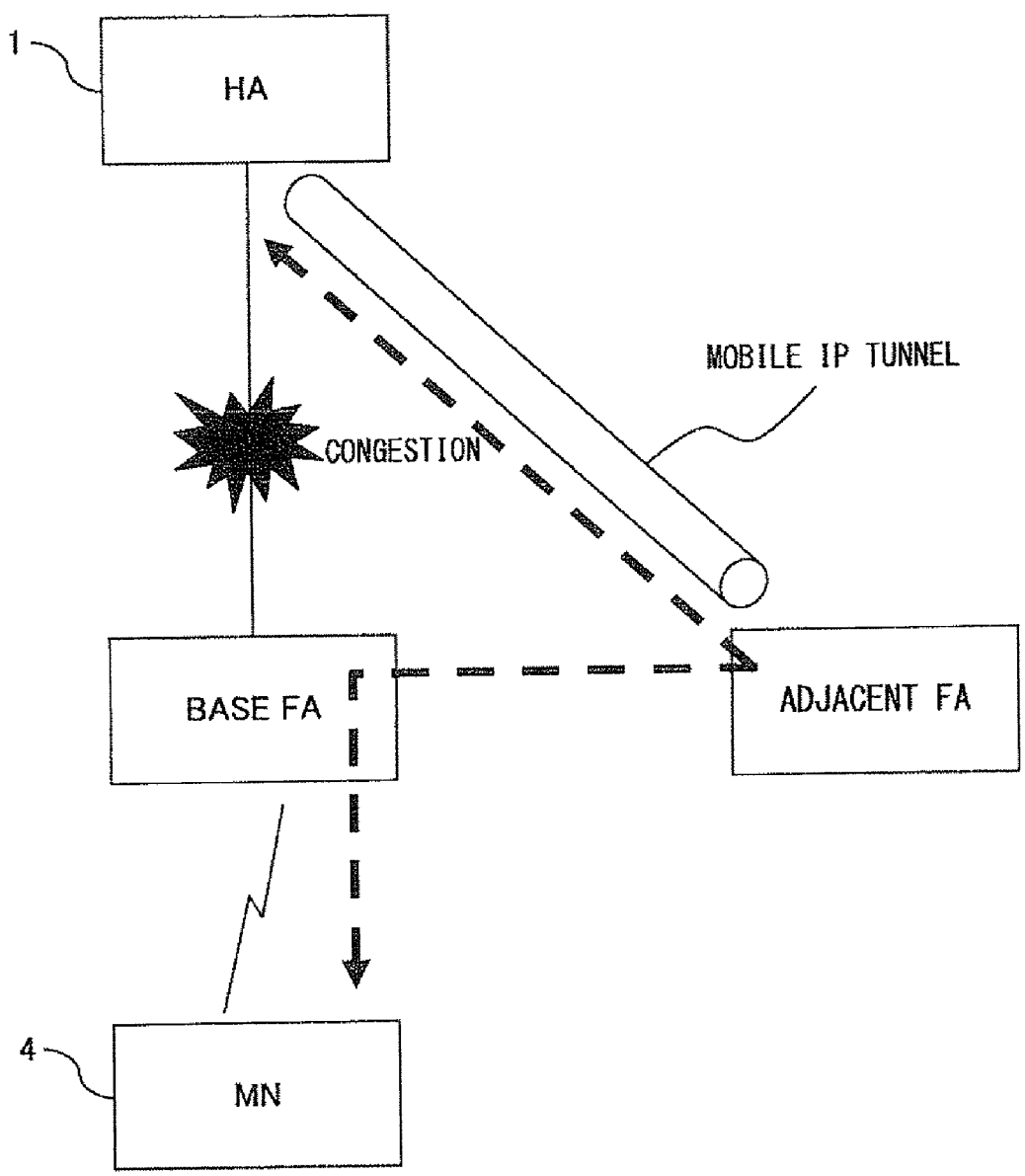
FIG. 16 is a diagram describing set up of a bypass route.

The adjacent foreign agent selected by the base foreign agent receives the location registration request from the base foreign agent. At this time, in the received location registration request, the IP address of the mobile node 4 is set as its source address, as illustrated in FIG. 15. Therefore, the adjacent foreign agent performs the same operation as the base foreign agent that received the location registration request from the mobile node 4. In other words, the adjacent foreign agent also performs the processes in the flowchart illustrated in FIG. 6. Then, the adjacent foreign agent transmits the location registration request to the home agent 1 in step i. Then, when the home agent 1 returns a location registration response to the adjacent foreign agent, the mobile IP tunnel for the mobile node 4 is set up between the home agent 1 and the adjacent foreign agent, as illustrated in FIG. 16. Here, the communication path for the mobile node 4 has been established between the base foreign agent and the adjacent foreign agent, as described above. Therefore, the mobile node 4 can connect to the home agent 1 via the base foreign agent and the adjacent foreign agent, and can conduct communication using the communication path.

<Step k>

Step k is performed when, while inquiry requests are transmitted from the base foreign agent to the adjacent foreign agents, no inquiry response is received from the adjacent foreign agents. In other words, step k is performed when no bypass route is found. In this case, the base foreign agent transmits the location registration request to the home agent in accordance with the normal mobile IP procedure.

<Step l>

When a location registration response corresponding to the location registration request transmitted in step k is received, it is determined that although there is congestion, the communication with the home agent 1 is still available. In this case, a tunnel for the mobile node is set up in step h, in accordance with the normal mobile IP procedure.

<Step m>

When no location registration response corresponding to the location registration request is received, it is determined that the location registration cannot be performed.

SPECIFIC EXAMPLE

Figure 17:
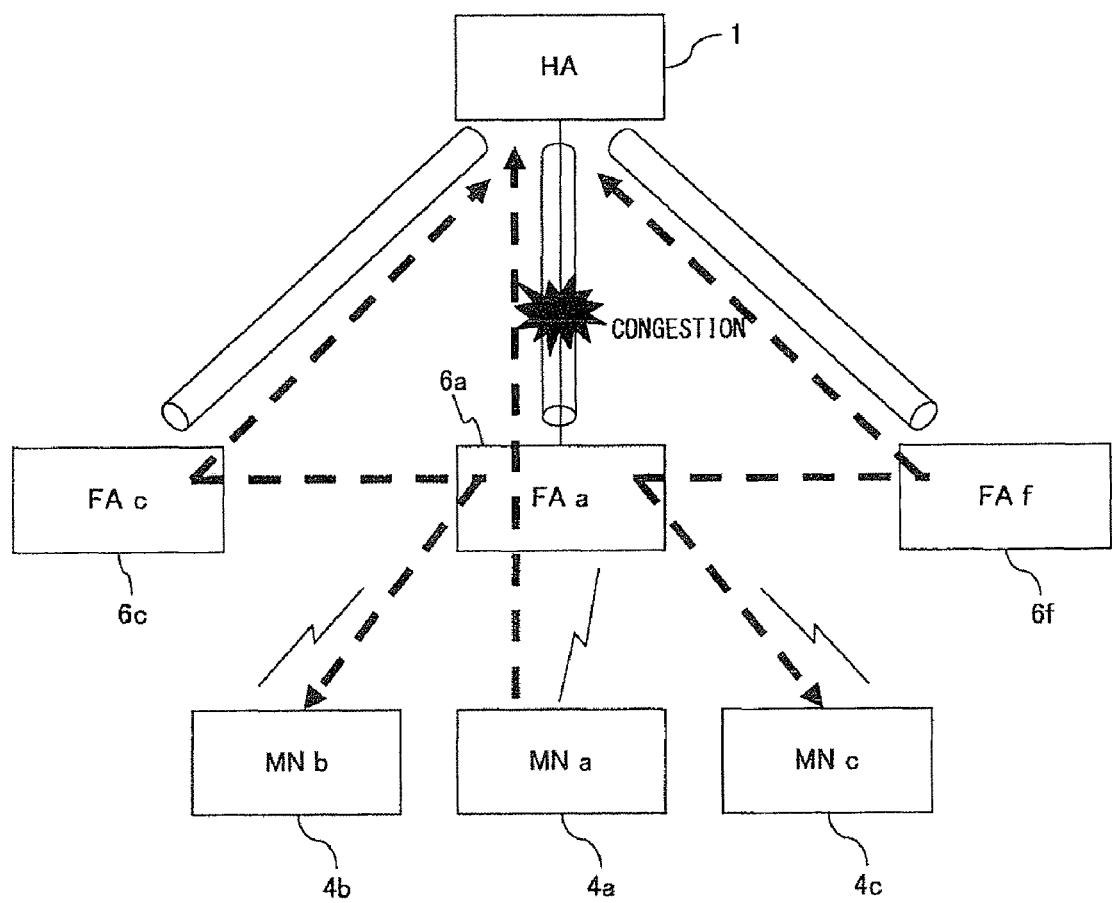
FIG. 17 is a diagram illustrating the state of a communication path.
Figure 19:
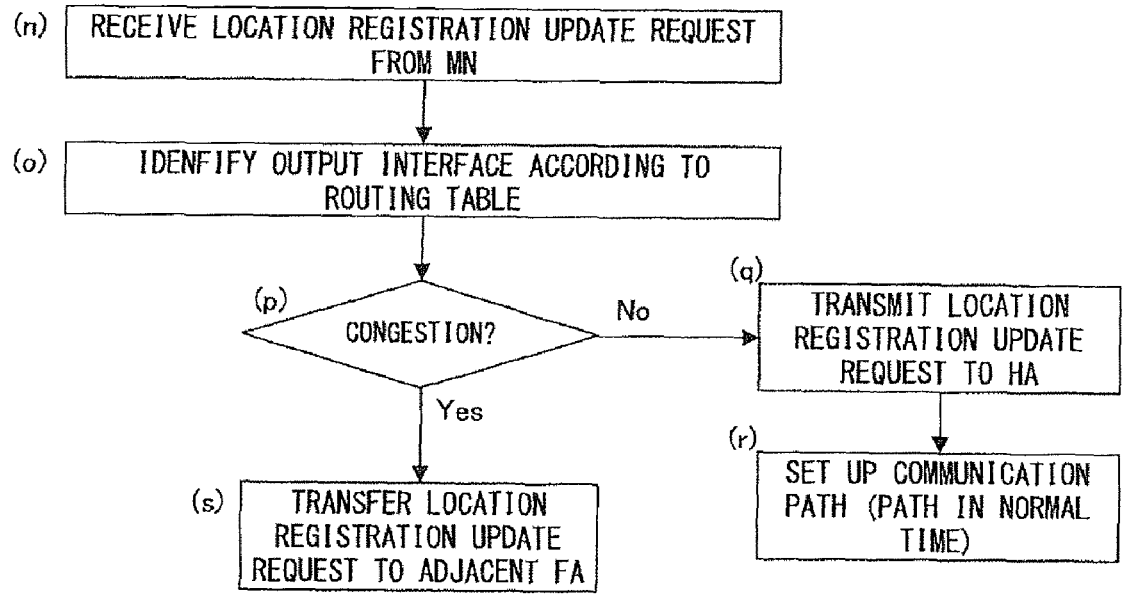
FIG. 19 is a flowchart illustrating a recovery procedure to a normal path.

A mobile IP communication system illustrated in FIG. 17 has three foreign agents 6a, 6c and 6f. It is assumed that one hop exists between the foreign agents 6a and 6c, and between the foreign agents 6a and 6f. A home agent 1 manages the location of mobile nodes 4a, 4b and 4c. In addition, it is assumed that the mobile nodes 4a, 4b and 4c transmit a location registration request in the communication area of the foreign agent 6a. In other words, the foreign agent 6a operates as the base foreign agent for the mobile nodes 4a, 4b and 4c, and the foreign agents 6c and 6f operate as adjacent foreign agents. Furthermore, it is assumed that there is congestion in the communication path between the foreign agent 6a and the home agent 1.

FIG. 18 is an example of an MN management table 15 of the foreign agent 6a. No "ADJACENT FA" is defined for the mobile node 4a (MNa). In this case, the mobile IP tunnel for the mobile node 4a is set up on the original communication path. In other words, the communication path congestion is selected. "ADJACENT FA=FAc" is defined for the mobile node 4b (MNb). In this case, the mobile IP tunnel for the mobile node 4b is set up between the home agent 1 and the foreign agent 6c. In the same manner, the mobile IP tunnel for the mobile node 4c is set up between the home agent 1 and the foreign agent 6f.

Upon receiving a location registration request (or transmitted data) from the mobile nodes 4a-4c, the foreign agent 6a checks whether or not "ADJACENT FA" is specified in the MN management table 15. When "ADJACENT FA" is specified, the received location registration request is transferred to the specified foreign agent. For example, when a location registration request is received from the mobile node 4b, the foreign agent 6a transfers the request to the foreign agent 6c. On the other hand, when "ADJACNT FA" is not specified, the routing table 12 is referred to, as well as in the normal mobile IP procedure. For example, when a location registration request is received from the mobile node 4a, the foreign agent 6a transmits the request via the interface defined in a routing table 12. Meanwhile, the MN management table 15 is also referred to, when a packet addressed to a mobile node is received. Thus, with the foreign agent according to the embodiment, the optimal bypass route can be selected respectively for each mobile node.

<Recovery from Congestion>

The mobile node 4 periodically transmits a location registration update request. Upon receiving the location registration update request in step n, the foreign agent 6 refers to the routing table 12 in step o, and identifies the output interface to home agent 1 for the normal time. Next, in step p, whether or not there is congestion in the identified interface is checked. If congestion continues, the MN management table is referred to, and the location registration update request is transferred to the specified adjacent foreign agent. On the other hand, if the congestion has been suppressed, the location registration update request is transferred to the home agent 1 in step q, in accordance with the routing table 12. Then, when an update response is received from the home agent 1, the communication path for the normal time is set up in step r. At this time, "ADJACENT FA" corresponding to the mobile node 4 is deleted in the MN management table 15.

<Other Embodiments>

While one foreign agent to which the location registration request is transferred is selected from a plurality of adjacent foreign agents in steps d-f of the flowchart illustrated in FIG. 6 in the embodiment described above, the procedure is not necessary in the present invention. In other words, the foreign agent to which a location registration request is transferred upon the occurrence of congestion may be fixedly determined in advance.

In addition, in the embodiment described above, when there is congestion or failure in the communication path between the base foreign agent and the home agent, a location registration request is transmitted from a foreign agent that is adjacent to the base foreign agent to the home agent, but the present invention is not limited to this configuration. In other words, a location registration request transmitted from the mobile node may be transferred to the home agent via the base foreign agent and two or more other foreign agents.

Furthermore, while the above embodiment describes the configuration and procedure in the mobile IP communication system, the present invention is not limited to this. In other words, the present invention may be applied to the procedure for setting, in a mobile communication system in which the location of a mobile terminal is registered in a server, a communication tunnel between the server and the mobile terminal, in accordance with the location registration.

The invention claimed is:

1. A mobile IP communication system comprising a home agent that manages a location of a mobile node in accordance with a location registration request and a plurality of foreign agents that are capable of accommodating a mobile node, wherein
the plurality of the foreign agents comprises:
a storage unit to store routing information representing a communication path to the home agent;
an output control unit to detect a state of the communication path to the home agent represented by the routing information; and;
a control unit to transfer a received location registration request, wherein
the control unit of a first foreign agent transfers the received location registration request in accordance with routing information stored in the storage unit of the first foreign agent, when the communication path between the first foreign agent and the home agent is in a normal state,
the control unit of the first foreign agent transfers the received location registration request to a second foreign agent, when the communication path between the first foreign agent and the home agent is not in the normal state, and
the first foreign agent comprises:
an inquiry unit to inquire other foreign agents about a state of the communication path to the home agent; and
a selection unit to select the second foreign agent to be transmitted the received location registration request from the other foreign agents in accordance with a response to an inquiry by the inquiry unit.

2. The mobile IP communication system according to claim 1, wherein
the output control unit of the first foreign agent detects whether the communication path to the home agent is congested, in accordance with a usage rate of a buffer memory storing a packet to be transmitted through the communication path.

3. The mobile IP communication system according to claim 1, wherein
the inquiry unit inquiries the other foreign agents about a metric of the communication path to the home agent; and
the selection unit selects a foreign agent that minimizes the metric of the communication path to the home agent as the second foreign agent.

4. The mobile IP communication system according to claim 3, wherein
the other foreign agents receiving the inquiry respond to the first foreign agent, when the communication path to the home agent is not congested.

5. The mobile IP communication system according to claim 1, wherein
a hop count between the first foreign agent and the second foreign agent is one.

6. The mobile IP communication system according to claim 1, wherein
the control unit of the first foreign agent sets an IP address of the mobile node as a source address of a packet for transferring the location registration request to the second foreign agent.

7. The mobile IP communication system according to claim 1, wherein
the storage unit of the first foreign agent stores management information for managing, for each mobile node, the foreign agent being a transfer destination of a location registration request, and
the control unit refers to the management information and performs a transfer process respectively for each node.

8. A mobile IP communication system comprising a home agent that manages a location of a mobile node in accordance with a location registration request and a plurality of foreign agents that are capable of accommodating a mobile node, wherein
the plurality of the foreign agents comprises:
a storage unit to store routing information representing a communication path to the home agent;
an output control unit to detect a state of the communication path to the home agent represented by the routing information;
a control unit to transfer a location registration request received from the mobile node in accordance with the routing information when the communication path to the home agent is in a normal state, and to transfer the location registration request received from the mobile node to another foreign agent when there is congestion or failure in the communication path to the home agent;
an inquiry unit to inquire other foreign agents about a state of the communication path to the home agent; and
a selection unit to select the another foreign agent to be transmitted the received location registration request from the other foreign agents in accordance with a response to an inquiry by the inquiry unit.

9. A foreign agent used in a mobile IP communication system comprising a home agent that manages a location of a mobile node in accordance with a location registration request and a plurality of foreign agents that are capable of accommodating a mobile node, comprising:
a storage unit to store routing information representing a communication path to the home agent;
an output control unit to detect a state of the communication path to the home agent represented by the routing information;
a control unit to transfer a location registration request received from the mobile node, when a communication path to the home agent is in a normal state, and to transfer the location registration request received from the mobile node to another foreign agent, when there is congestion or failure in the communication path to the home agent;
an inquiry unit to inquire other foreign agents about a state of the communication path to the home agent; and
a selection unit to select the another foreign agent to be transmitted the received location registration request from the other foreign agents in accordance with a response to an inquiry by the inquiry unit.

10. A location registration method in a mobile IP communication system comprising a home agent that manages a location of a mobile node in accordance with a location registration request and a plurality of foreign agents that are capable of accommodating a mobile node, comprising:
transmitting a location registration request from a mobile node to a first foreign agent;
detecting a state of an optimal communication path from the first foreign agent to the home agent;
transmitting the location registration request from the first foreign agent to the home agent via the optimal communication path when the optimal communication path is in a normal state;
transferring the location registration request from the first foreign agent to a second foreign agent when the optimal communication path is not in the normal state;

transmitting the location registration request from the second foreign agent to the home agent; and inquiring, using the first foreign agent, other foreign agents about a state of the communication path to the home agent and selecting the second foreign agent to be transmitted the received location registration request from the other foreign agents in accordance with a response to an inquiry by the first foreign agent.

* * * * *